Patented Feb. 15, 1944

2,341,724

UNITED STATES PATENT OFFICE 2,341,724

COFFEE

Daniel Joseph Kennedy, Vancouver, British Columbia, Canada

No Drawing. Application March 11, 1942, Serial No. 434,250

7 Claims. (Cl. 99—65)

My invention relates to improvements in coffee, the objects of which are to provide a method of treating green coffee prior to roasting whereby the flavour of the coffee beverage made therefrom will be materially enhanced. Among the other objects of the invention is the desire to develop in the green coffee all the acids and other components which tend to improve the coffee as an auxiliary food. A further object is to restore the coffee to an active state such as that in which the berries were in prior to the picking, drying and processing of the coffee for the market.

The invention contemplates a treatment with ultra violet rays which may be applied to any individual coffee or blend of coffee at any time after the product has been hulled and dried, which coffee may be stored after treatment if desired, without detracting from the improvement imparted to it by the treatment.

The invention comprises the rapid introduction of moisture to the berries without raising its temperature beyond that to which it may have been subjected to during its growing period and of subjecting the moistened berries to the influence of ultra violet rays.

In my co-pending application Serial Number 332,499 I have referred to the treatment of green coffee with ultra violet ray by applying said rays through a mist, but the present method contemplates first restoring the dried and cleaned berries to what might be termed an active state such as that prevailing when the coffee is ripe and ready for picking, and irradiating it in that condition.

The coffee is permeated with moisture throughout and is kept at growing temperature during the moistening process, so that it becomes more susceptible to the reception of ultra violet rays than the dry coffee and the penetration of said rays is greater.

I accomplish these desirable results by taking green coffee which has been previously dried and processed for the market and chill said coffee preferably in a dry atmosphere to a freezing or lower temperature by artificial refrigeration for an hour or more.

It will be understood that the coffee as received from storage is substantially dry but does contain a small percentage of residual moisture.

The residual moisture in the green coffee is insufficient to cause any destruction of the cell structure when it is subjected to freezing temperature but some chemical change takes place with the freezing which enhances the flavour characteristics of the coffee when irradiated either when in the frozen state or subsequent thereto. Also the freezing in a dry atmosphere seems to reduce the residual moisture in the coffee and irradiating of the dried green coffee produces a beverage which appears to render the coffee beverage made therefrom to be more palatable and beneficial to persons who suffer from anaemia or other similar ailments.

Immediately following the removal of the coffee from the freezing zone or before any appreciable rise has taken place in the temperature of the coffee, I pass steam at atmospheric pressure through the coffee. The steam is admitted in volume so that a relatively large amount of moisture is imparted to the green coffee before its temperature is raised beyond 90–110 degrees Fahrenheit.

I find that sufficient moisture can be imparted to the coffee before any drops of water form on the surface of the berries.

The moisture absorbed, rapidly penetrates the berries and leaves them substantially in a condition similar to that in which they were just prior to being picked from the tree, and it is believed that its tissues again become active as when in the growing state.

The moistened coffee is then subjected to ultra violet rays for a period of a few minutes, say two to five, according to the nature and origin of the coffee. The ultra violet rays have a deeper penetration of the coffee when moistened according to the method above described, consequently a shorter exposure than that now commercially practiced will give similar or better results in the flavour of the treated coffee.

The reduction of time of exposure is of material importance commercially as in the present practice, since the irradiation of coffee is accomplished simultaneously, and in the same machine with the blending of the different kinds and qualities of coffee.

The blending can be effected just as well in the two to five minutes as in the longer time now usually taken to irradiate, consequently a larger output can be obtained from a given size of blending equipment.

While the above description deals primarily with the moistening of the chilled berries highly satisfactory results with regard to developing certain beneficial acids and components of the coffee can be obtained by chilling the coffee to 32 degrees Fahrenheit or lower and treating said coffee with ultra violet rays. The flavour of the coffee beverage produced by the above mentioned unmoistened coffee is considerably improved over non-irradiated coffee or non-frozen coffee.

What I claim as my invention is:

1. The process of treating green coffee which comprises chilling the coffee to at least 32 degrees Fahrenheit, moistening the chilled coffee and subsequently treating said coffee to ultra violet ray for a period of over two minutes.

2. The process of treating coffee which comprises freezing green coffee and irradiating it with ultra violet ray for a period of over two minutes.

3. The process of treating green coffee which comprises freezing the coffee in a dry atmosphere, subsequently moistening the chilled coffee and treating it with ultra violet rays for a period of over two minutes.

4. The process of treating green coffee which comprises freezing the coffee in a dry atmosphere, subsequently passing steam through the chilled coffee and treating it with ultra violet ray for a period of over two minutes.

5. The process of treating green coffee which comprises freezing the coffee in a dry atmosphere, subsequently passing steam through the chilled coffee immediately following its removal from the freezing zone and treating it with ultra violet ray for a period of over two minutes.

6. The process of treating green coffee which comprises chilling the coffee to at least freezing point, subsequently moistening the berries with steam at substantially atmospheric pressure while maintaining the coffee at a temperature of not exceeding 110 degrees Fahrenheit and irradiating the moistened coffee with ultra violet ray for a period of over two minutes.

7. The process of treating green coffee which comprises reducing the residual moisture of the coffee as by cooling, then increasing the moisture content by adding water thereto in vapor form, and then irradiating the moistened coffee with ultra violet ray for a period of over two minutes.

DANIEL JOSEPH KENNEDY.